(12) United States Patent
Terao

(10) Patent No.: US 10,521,066 B2
(45) Date of Patent: Dec. 31, 2019

(54) RESISTIVE TOUCH PANEL

(71) Applicant: FANUC Corporation, Yamanashi (JP)

(72) Inventor: Yuuki Terao, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 62 days.

(21) Appl. No.: 15/221,659

(22) Filed: Jul. 28, 2016

(65) Prior Publication Data
US 2017/0031483 A1 Feb. 2, 2017

(30) Foreign Application Priority Data

Jul. 31, 2015 (JP) .................. 2015-152064

(51) Int. Cl.
G06F 3/045 (2006.01)
(52) U.S. Cl.
CPC .................... G06F 3/045 (2013.01)
(58) Field of Classification Search
CPC .............. G06F 3/045; G06F 3/0416; G06F 2203/04104
USPC ........................................................ 345/174
See application file for complete search history.

(56) References Cited

U.S. PATENT DOCUMENTS

| | | | | |
|---|---|---|---|---|
| 6,380,497 B1* | 4/2002 | Hashimoto | ............. | G06F 3/045 200/5 A |
| 6,459,424 B1 | 10/2002 | Resman | | |
| 2004/0090429 A1 | 5/2004 | Geaghan et al. | | |
| 2006/0102462 A1 | 5/2006 | Bourdelais et al. | | |
| 2006/0274047 A1* | 12/2006 | Spath | ...................... | G06F 3/045 345/173 |
| 2008/0054875 A1* | 3/2008 | Saito | .................... | A61B 5/1172 324/71.5 |
| 2010/0177055 A1* | 7/2010 | Ookawara | ............... | G06F 3/045 345/173 |

(Continued)

FOREIGN PATENT DOCUMENTS

| | | |
|---|---|---|
| CN | 1707515 A | 12/2005 |
| CN | 1711520 A | 12/2005 |

(Continued)

OTHER PUBLICATIONS

Office Action in JP Application No. 2015-152064, dated Aug. 1, 2017, 6 pp.

(Continued)

Primary Examiner — Yuzhen Shen
(74) Attorney, Agent, or Firm — Hauptman Ham, LLP

(57) ABSTRACT

The invention provides a touch panel including: two resistive layers; a plurality of spacer dots disposed between the two resistive layers, the spacer dots spacing the two resistive layers apart from each other, the two resistive layers facing each other; and a glass panel bonded to an underside of one of the resistive layers to provide support, the one of the resistive layers positioned opposite from a touch surface, wherein one side of the glass panel has at least one region including a material having a modulus of elasticity different from a modulus of elasticity of the glass panel, the one side of the glass panel being adjacent to the one of the resistive layers. With this configuration, the touch sensitivity in the at least one region is differentiated from that of the remaining regions.

6 Claims, 5 Drawing Sheets

(56) References Cited

U.S. PATENT DOCUMENTS

| | | | |
|---|---|---|---|
| 2011/0148800 A1* | 6/2011 | Nishikawa | B32B 7/12 345/173 |
| 2011/0199324 A1* | 8/2011 | Wang | G06F 3/0412 345/173 |
| 2012/0235935 A1* | 9/2012 | Ciesla | G06F 3/0202 345/173 |
| 2013/0050095 A1* | 2/2013 | Nakajima | G06F 3/0202 345/168 |
| 2015/0114814 A1 | 4/2015 | Sukuki et al. | |

FOREIGN PATENT DOCUMENTS

| | | |
|---|---|---|
| CN | 203746035 U | 7/2014 |
| CN | 104599878 A | 5/2015 |
| JP | 10-333828 A | 12/1998 |
| JP | 2010-224902 A | 10/2010 |
| JP | 2011-39851 A | 2/2011 |
| JP | 2013-50903 A | 3/2013 |
| JP | 2013-127690 A | 6/2013 |

OTHER PUBLICATIONS

Office Action in DE Application No. 102016113715.4, dated May 7, 2019, 15pp.

"Besser bedienen mit Touchscreens", Analog-resistive Displays werden multitouch-faehig, retrieved on Apr. 3, 2019, pp. 1-4, Germany, 4pp.

* cited by examiner

RESISTIVE TOUCH PANEL

RELATED APPLICATIONS

The present application claims priority to Japanese Application Number 2015-152064, filed Jul. 31, 2015, the disclosure of which is hereby incorporated by reference herein in its entirety.

BACKGROUND OF THE INVENTION

1. Field of the Invention

The present invention relates to a resistive touch panel.

2. Description of the Related Art

Control input devices including a touch panel are widely used. FIG. 1 is a diagram illustrating the structure of a typical resistive touch panel 1 (hereinafter referred to as a "touch panel"). A resistive layer 11 is bonded to one side of a film 10. A force can be applied to the other side of the film 10 by a finger 3, a stylus pen (not illustrated), or other means. A resistive layer 12 is bonded to one side of a glass panel 13. In the touch panel 1, spacer dots 14 are interposed between the two resistive layers 11, 12 to space the resistive layers 11, 12 apart from each other. Under the touch panel 1 is disposed a liquid crystal display (LCD) 4.

When a force is applied to the top side of the touch panel 1 (to the film 10) by the finger 3, a stylus pen, or other means, the two resistive layers 11, 12 under applied voltage become shorted to each other, and by measuring the voltage values at the touched location with a touch panel controller, the coordinates of the touched location can be determined.

The spacer dots 14 are provided to prevent inadvertent contact between the two resistive layers 11, 12 due to external factors such as the environment. Conventional touch panels 1 are not configured to differentiate the touch sensitivity in one or more regions from that in the remaining regions. A device for sensing the pressing force may be usable but it cannot by itself alter the pressing force to the touch panel (Japanese Patent Laid-Open No. 2013-127690).

When a touch panel is used for operation of a machine tool, responsivity to a light touch is desired for use in character entry and button operations (including tapping, rotation, enlargement and reduction operations).

On the other hand, when a touch panel is employed for a machine tool control panel, which includes buttons for actually activating the machine, it is necessary to prevent accidents due to malfunction of the machine. Thus, it is desired that the buttons for actually activating the machine do not respond to a light touch but respond to a somewhat heavy touch.

SUMMARY OF THE INVENTION

Accordingly, an object of the present invention is to provide a touch panel in which the touch sensitivity in one or more regions is differentiated from the touch sensitivity in the remaining regions.

A resistive touch panel according to the present invention includes: two resistive layers; a plurality of spacer dots disposed between the two resistive layers, the spacer dots spacing the two resistive layers apart from each other, the two resistive layers facing each other; and a glass panel bonded to an underside of one of the resistive layers to provide support, the one of the resistive layers positioned opposite from a touch surface, wherein one side of the glass panel has at least one region including a material having a modulus of elasticity different from a modulus of elasticity of the glass panel, the one side of the glass panel being adjacent to the one of the resistive layers.

In the resistive touch panel, the one side of the glass panel may have a plurality of regions including the material having the modulus of elasticity different from the modulus of elasticity of the glass panel.

In the resistive touch panel, the at least one region at the one side of the glass panel may have a recessed portion and the material having the modulus of elasticity different from the modulus of elasticity of the glass panel may be disposed in the recessed portion.

In the resistive touch panel, the at least one region at the one side of the glass panel may have a through hole and a member closing a bottom of the through hole, and the material having the modulus of elasticity different from the modulus of elasticity of the glass panel may be disposed in a region formed by the through hole and the member closing the bottom.

With the present invention, it is possible to provide a touch panel in which the touch sensitivity in one or more regions is differentiated from the touch sensitivity in the remaining regions.

BRIEF DESCRIPTION OF THE DRAWINGS

The above and other objects and features of the present invention will become more apparent from the following descriptions of embodiments taken in connection with the accompanying drawings, in which.

DETAILED DESCRIPTION OF THE PREFERRED EMBODIMENTS

Now embodiments of the present invention will be described with reference to the drawings. Elements identical or similar to those in the conventional art are denoted by the same numerals. An embodiment of a touch panel according to the present invention will be described.

Figure 1:
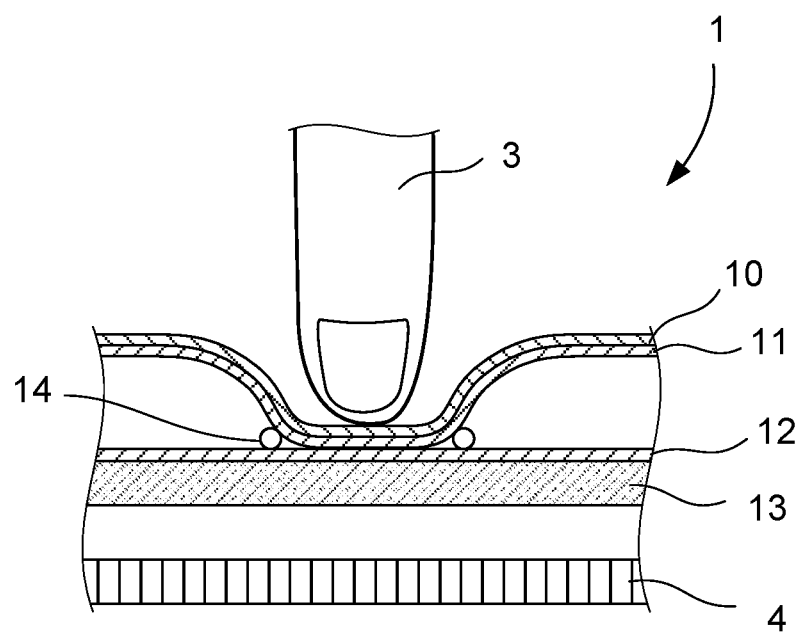
FIG. 1 is a diagram illustrating the structure of a typical resistive touch panel.
Figure 2:
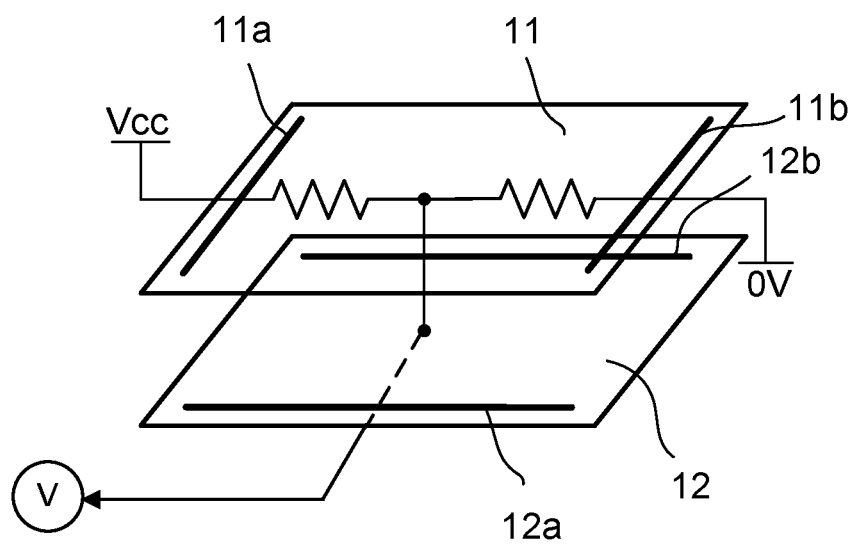
FIG. 2 is a diagram illustrating a method for determining the X coordinate.
Figure 3:
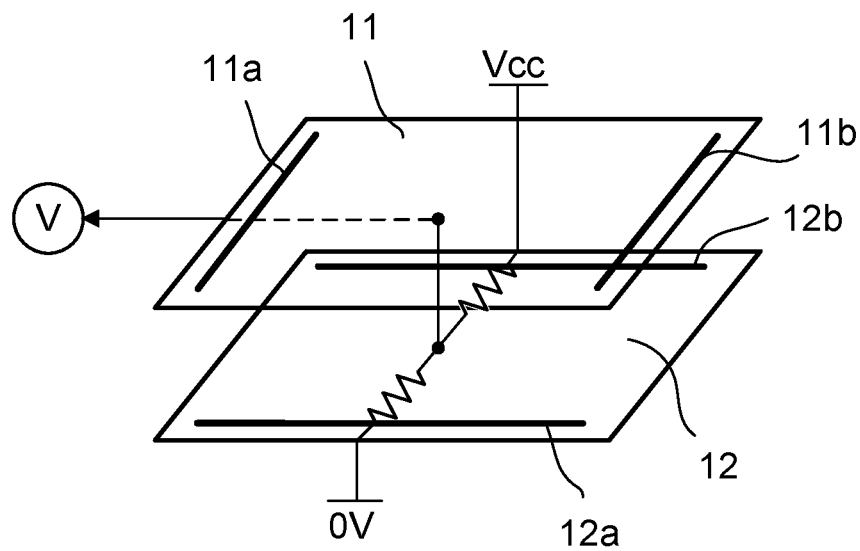
FIG. 3 is a diagram illustrating a method for determining the Y coordinate.

FIG. 2 is a diagram illustrating a method for determining the X coordinate. FIG. 3 is a diagram illustrating a method for determining the Y coordinate.

As described in the related art section, resistive touch panels include two resistive layers, spacer dots interposed therebetween, and a glass panel bonded to the underside.

The mechanism is as follows. When a force is applied to the top side of the touch panel (to the film) by a finger, a stylus pen, or other means, the two resistive layers under applied voltage become shorted to each other, and by measuring the voltage values at the touched location with a touch panel controller, the coordinates of the location are determined (FIGS. 2 and 3). The spacer dots are provided to prevent inadvertent contact between the two resistive layers due to external factors such as the environment. The liquid crystal display (LCD) is located under the touch panel (at the rear of the touch panel display).

Method for Determining X Coordinate

A method for determining the X coordinate is as follows. Electrodes 11a, 11b are provided at left and right ends of the resistive layer 11, which is the upper one (adjacent to the film) of the two resistive layers 11, 12, and a voltage is applied across one of them. When a touch has been performed and the two resistive layers 11, 12 have become shorted to each other, the voltage can be measured via the resistive layer 12 adjacent to the glass panel. Electrodes 12a, 12b are provided at front and rear ends of the resistive layer 12. A voltage drop occurs for the resistance between the electrode and the point that has been touched, and the coordinate is determined by measuring the voltage value.

Method for Determining Y Coordinate

A method for determining the Y coordinate is as follows. Conversely to the determination of the X coordinate, a voltage is applied across the resistive layer adjacent to the glass panel. When a touch has been performed and the two resistive layers have become shorted to each other, the voltage can be measured via the resistive layer adjacent to the film. A voltage drop occurs for the resistance between the electrode and the point that has been touched, and the coordinate is determined by measuring the voltage value.

The touch panel performs the determinations of the X coordinate and Y coordinate described above alternately (at high speed).

Figure 4:
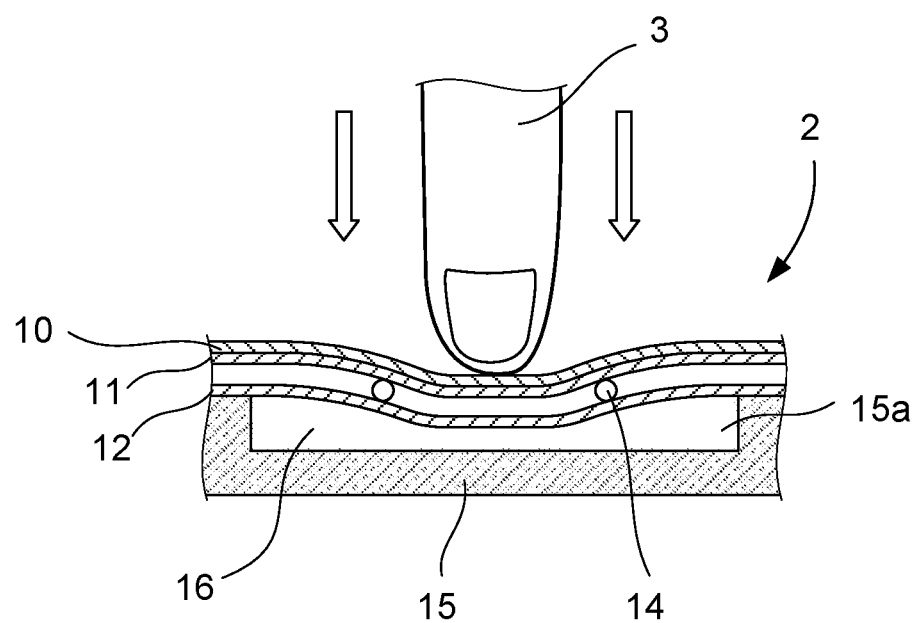
FIG. 4 is a diagram illustrating a touch panel according to an embodiment of the present invention with a relatively weak pressing force applied thereto.
Figure 5:
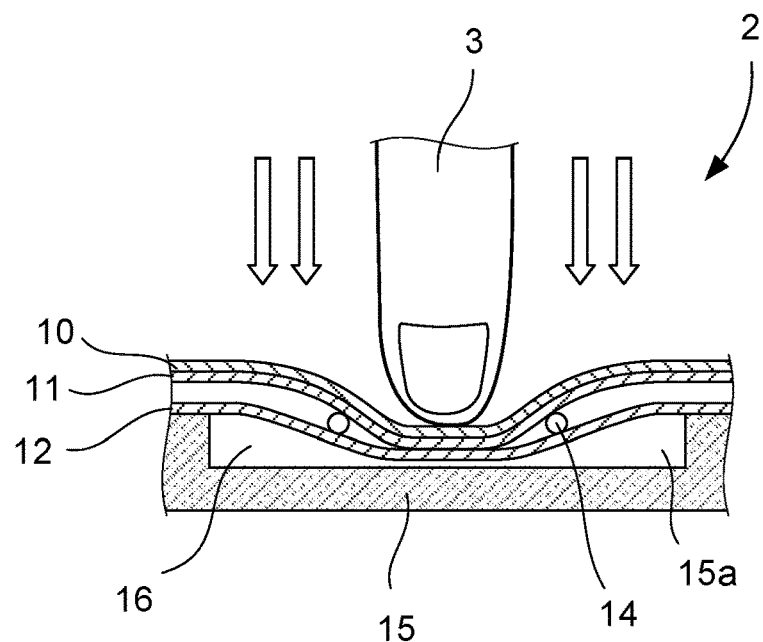
FIG. 5 is a diagram illustrating the touch panel according to the embodiment of the present invention with a relatively strong pressing force applied thereto.
Figure 6:
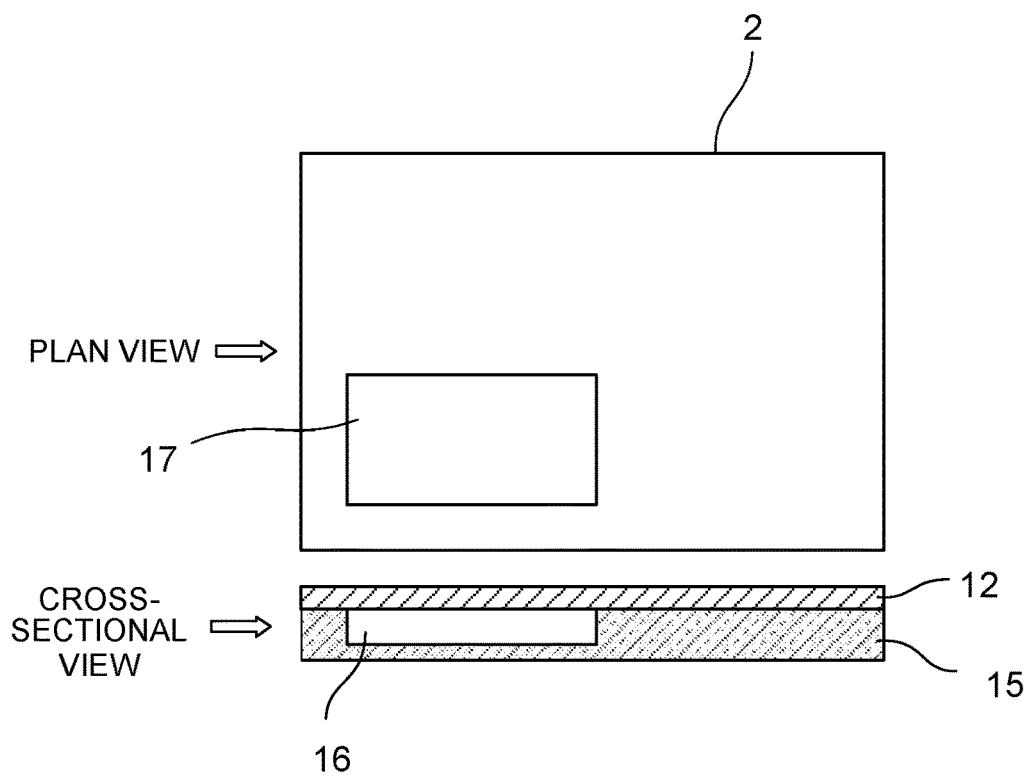
FIG. 6 presents a plan view and a cross-sectional view of the touch panel according to the embodiment of the present invention.

FIG. 4 is a diagram illustrating the touch panel with a light touch applied thereto (a relatively weak pressing force applied thereto). FIG. 5 is a diagram illustrating the touch panel with a relatively strong pressing force applied thereto. FIG. 6 presents a plan view and a cross-sectional view of the touch panel.

A touch panel 2, which is a resistive touch panel, includes a resistive layer 11 bonded to one side of a film 10, similarly to the conventional art. A force can be applied to the other side of the film 10 by a finger 3, a stylus pen (not illustrated), or other means. A resistive layer 12 is bonded to one side of a glass panel 15. In the touch panel 2, spacer dots 14 are interposed between the two resistive layers 11, 12 to space the resistive layers 11, 12 apart from each other.

In the glass panel 15 of the touch panel 2, the side abutting the resistive layer 12 includes a region (recessed portion 15a) that is recessed relative to the remaining regions. This region corresponds to the region where the touch sensitivity is to be differentiated and this region is formed by machining or other means (see region 17 for a relatively strong pressing force in FIG. 6). Between the resistive layer 12 at the rear (adjacent to the glass panel) and the glass panel 15 (in the recess (recessed portion 15a) formed in the glass panel 15) is placed a material having high transparency and having a lower modulus of elasticity than that of the glass panel 15 (a material 16 having high transparency and a low modulus of elasticity).

As illustrated in FIG. 4, in the touch panel 2, upon application of a touch operation to the region where the touch sensitivity is differentiated from that of the remaining regions, the resistive layer 12 adjacent to the glass panel 15 is repelled away to the rear at which the liquid crystal is located. Thus, when a light touch is applied, i.e., a relatively weak pressing force with a small pressing force is applied, the resistive layers 11, 12 are not brought into contact with each other and therefore the light touch is not recognized as a touch operation.

As illustrated in FIG. 5, in order for a touch to be recognized by applying a relatively strong pressing force, application of a pressing force stronger than a pressing force to be applied to the remaining regions is necessary to bring the resistive layers 11, 12 into contact with each other, and thus the pressing force is to be differentiated between one or more regions and the remaining regions within the touch panel 2. In the state illustrated in FIG. 4, when a stronger pressing force is applied to the touch panel 2, the resistive layers 11, 12 are brought into contact with each other so that the pressing force is recognized as a touch operation.

FIG. 6 presents a plan view and a cross-sectional view of the touch panel 2. In the touch panel 2 illustrated in FIG. 6, a lower left region of the touch panel is specified as a region requiring a relatively strong pressing force (region 17 for a relatively strong pressing force). The mechanism is as follows. A material having a lower modulus of elasticity than that of the remaining regions of the glass panel (a material 16 having high transparency and a low modulus of elasticity, e.g., a gel material having high transparency) is placed in the recessed portion 15a formed in the glass panel 15 so that the materials (which serve as members to support the resistive layer when it is pressed) disposed rearward of the resistive layer 12 have different hardnesses and therefore the pressing force to be applied to the touch panel is to be varied.

Figure 7:
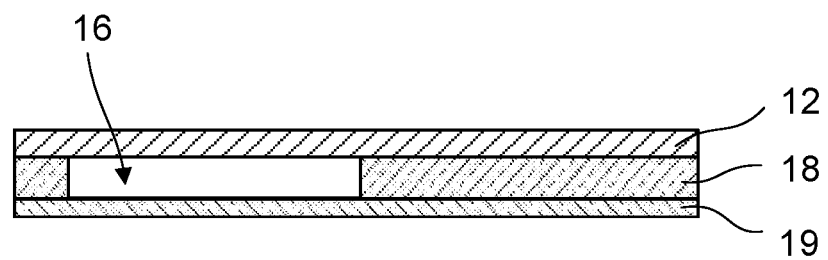
FIG. 7 is a diagram illustrating a configuration of the glass panel portion.

FIG. 7 is a diagram illustrating an alternative configuration of the glass panel 15 of the touch panel 2. The above-described embodiment of the present invention is configured such that a portion of the glass panel 15 is machined (see FIG. 6), whereas an alternative embodiment of the present invention may be such that two glass panels 18, 19 are bonded to each other. A resistive layer 12 is bonded to one side of a glass panel 18. The glass panel 19 is used as a member to serve to support an elastic member embedded in a portion of the glass panel 18. In this configuration, a bored hole (through hole) is formed in a portion of the upper glass panel (glass panel 18) and then the glass panel 19 is bonded to the glass panel 18, so that the manufacturing costs can be reduced compared with the glass panel 15 illustrated in FIG. 6. A material 16 having high transparency and a low modulus of elasticity is placed in the bored hole.

Figure 8:
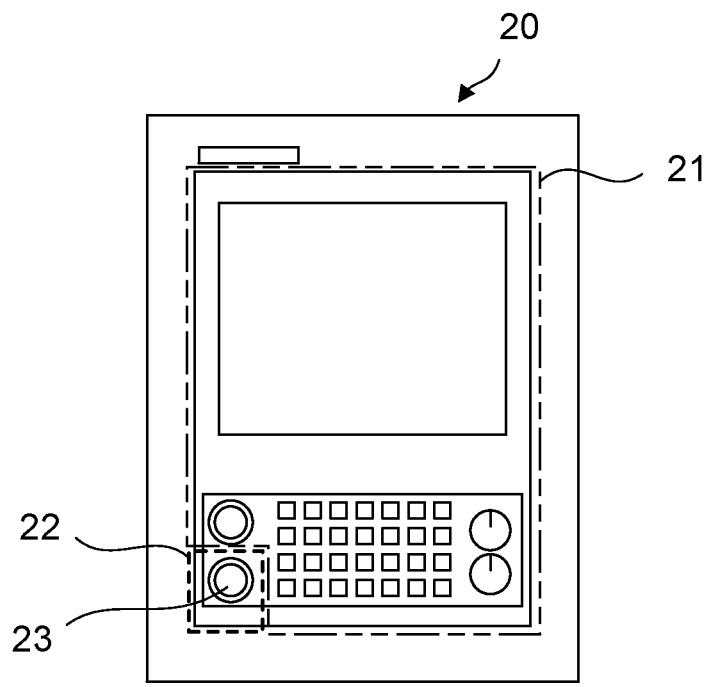
FIG. 8 is a diagram illustrating an example in which the region where a machine control switch is disposed is configured so that malfunction of the machine can be prevented.

FIG. 8 is a diagram illustrating an example in which the region where a machine control switch is disposed is configured so that malfunction of the machine can be prevented. As illustrated in FIG. 8, the region where a switch for activating the machine (a switch that should not be readily turned on by a relatively light and weak pressing force) for example is disposed is specified as the region where a relatively strong pressing force is necessary to thereby make it possible to prevent malfunction of the machine that may be caused by inadvertent contact by the machine operator. The remaining regions are configured such that the glass panel abuts the back side of the resistive layer so that operation can be made with a light touch by the operator.

A touch panel display 20, which is a machine control panel, includes a region 21 specified for a relatively weak pressing force and a region 22 specified for a relatively strong pressing force. The region 22 specified for a relatively strong pressing force is configured to include the region where the switch 23 for activating the machine is disposed.

Figure 9:
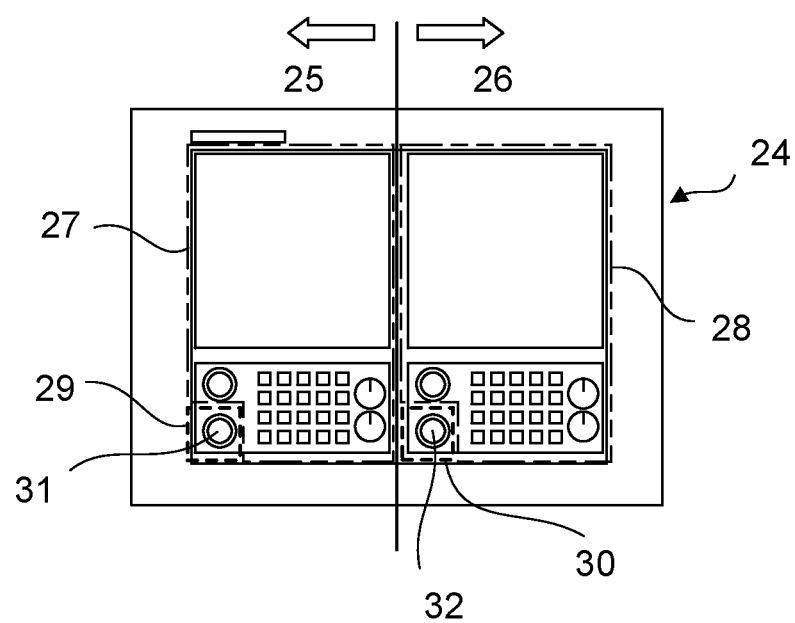
FIG. 9 is a diagram illustrating an example for performing control of a plurality of machines with a single device.

FIG. 9 is a diagram illustrating an example for performing control of a plurality of machines with a single device. As illustrated in FIG. 9, a touch panel including a plurality of regions where a relatively strong pressing force is necessary in a single touch panel can also be realized. This is effective in performing control of more than one machines with a single device. A machine control device 24 includes a region 25 for controlling a machine 1 and a region 26 for controlling a machine 2. The region 25 for controlling the machine 1 includes a region 27 specified for a relatively weak pressing force, and a region 29 specified for a relatively strong pressing force where a machine activation switch 31 is disposed. Likewise, the region 26 for controlling the machine 2 includes a region 28 specified for a relatively weak pressing force, and a region 30 specified for a relatively strong pressing force where a machine activation switch 32 is disposed.

As described above, touch panels according to embodiments of the present invention are capable of providing the following advantages: malfunction of a machine or equipment can be prevented which may otherwise be caused by inadvertent contact with an activation switch for example on the touch panel by the operator; the pressing force sensitivity is adjustable between relatively weak and relatively strong in any region of the touch panel rather than being uniform over the entirety thereof; various senses of touch can be provided by varying the thickness or material of the elastic member; the operator can have a sense similar to the sense of "pressing a button" because a deep press is necessary when performing touch input; and an region(s) where the pressing force sensitivity is different from that of the remaining regions can be provided in any location of the touch panel.

Although embodiments of the present invention have been described in the foregoing specification, the present invention is not limited to the above-described examples of the embodiments and may be embodied in other forms by making appropriate modifications thereto.

The invention claimed is:

1. A resistive touch panel, comprising:

two resistive layers;

a plurality of spacer dots disposed between the two resistive layers, the spacer dots spacing the two resistive layers apart from each other, the two resistive layers facing each other; and a glass panel bonded to an underside of one of the resistive layers to provide support, the one of the resistive layers positioned opposite from a touch surface, wherein one side of the glass panel has at least one region including a material having a modulus of elasticity different from a modulus of elasticity of the glass panel, the one side of the glass panel being adjacent to the one of the resistive layers, both the two resistive layers are configured to deform in response to a pressure applied to the touch surface facing one of the resistive layers, in response to a first pressure applied to the touch surface, both the two resistive layers deform while keeping a space between the two resistive layers defined by the plurality of spacer dots, in response to a second pressure, which is greater than the first pressure, applied to the touch surface, both the two resistive layers deform and the two resistive layers are brought into contact with each other, and both the two resistive layers are configured to deform in a same direction at the at least one region.

2. The resistive touch panel according to claim 1, wherein the one side of the glass panel has a plurality of regions including the material having the modulus of elasticity different from the modulus of elasticity of the glass panel.

3. The resistive touch panel according to claim 1, wherein the at least one region at the one side of the glass panel has a recessed portion and the material having the modulus of elasticity different from the modulus of elasticity of the glass panel is disposed in the recessed portion.

4. The resistive touch panel according to claim 1, wherein the at least one region at the one side of the glass panel has a through hole and a member closing a bottom of the through hole, and the material having the modulus of elasticity different from the modulus of elasticity of the glass panel is disposed in a region formed by the through hole and the member closing the bottom.

5. A resistive touch panel having a touch surface, the resistive touch panel comprising:

a first resistive layer and a second resistive layer facing the first resistive layer, the first resistive layer being closer to the touch surface than the second resistive layer;

a plurality of spacer dots disposed between the first resistive layer and the second resistive layer, the spacer dots spacing the first and second resistive layers apart from each other; and a glass panel bonded to the second resistive layer to provide support, wherein the glass panel includes at least one region including a material having a modulus of elasticity lower than a modulus of elasticity of another region of the glass panel, the at least one region of the glass panel being adjacent to the second resistive layer, the material is disposed between the second resistive layer and the at least one region of the glass panel, both the first and the second resistive layers are configured to deform in response to a pressure applied to the touch surface facing the first resistive layer, the material is configured to elastically deform in response to the deformation of the second resistive layer, in response to a first pressure applied to the touch surface, both the first and second resistive layers deform while keeping a space between the first and second resistive layers defined by the plurality of spacer dots, in response to a second pressure, which is greater than the first pressure, applied to the touch surface, both the first and second resistive layers deform and the first and second resistive layers are brought into contact with each other, and both the first and second resistive layers are configured to deform in a same direction at the at least one region.

6. The resistive touch panel of claim 5, wherein the material is gel material having transparency.

* * * * *